No. 890,549. PATENTED JUNE 9, 1908.
A. G. ZAMEL.
ARTIFICIAL BAIT.
APPLICATION FILED JULY 11, 1907.
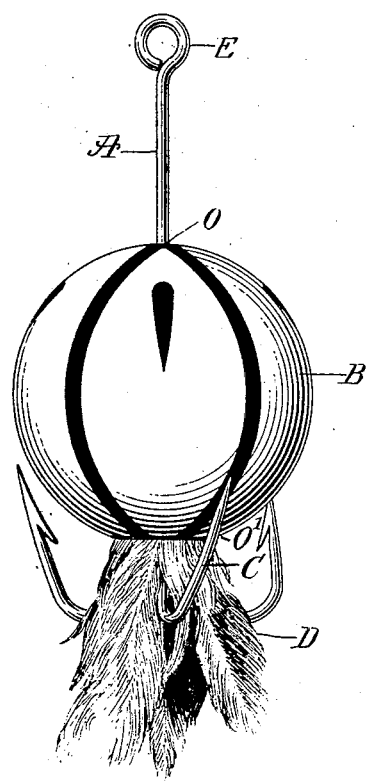
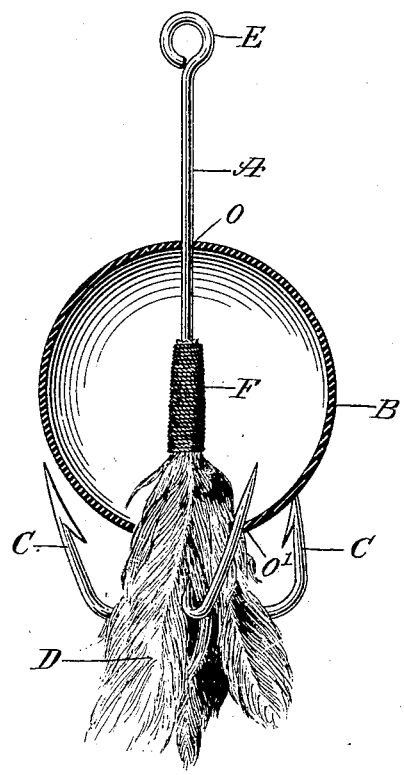
WITNESSES
Edward Thorpe,
INVENTOR
Albert G. Zamel
BY Munn & Co
ATTORNEYS

UNITED STATES PATENT OFFICE.

ALBERT G. ZAMEL, OF CHICAGO, ILLINOIS.

ARTIFICIAL BAIT.

No. 890,549.  Specification of Letters Patent.  Patented June 9, 1908.

Application filed July 11, 1907. Serial No. 383,268.

*To all whom it may concern:*

Be it known that I, ALBERT G. ZAMEL, a citizen of the United States, residing at Chicago, in the county of Cook and State of Illinois, have invented certain new and useful Improvements in Artificial Bait, of which the following is a specification.

This invention relates to fish baits and more particularly such baits as are used as lures when drawn through the water.

The object of this invention is to provide an improved bait for fishing and the like, affording means for protecting the hooks against fouling by weeds and similar obstructions while at the same time leaving the hooks exposed when the bait is struck by a fish.

The further object of the invention is to provide a bait having hooks guarded against fouling by obstructions in the water and presenting a lure adapted to attract fish.

The structure embodying the features of construction and arrangement of parts of my invention is fully illustrated in the accompanying drawings and is hereinafter described in the claims that follow.

In the drawings similar reference letters refer to similar parts in both figures, in which Figure 1 is an elevation of a structure embodying the features of my invention; and Fig. 2 is a similar elevation showing the details of construction, part of which details are shown in section.

Referring to the illustrated parts of the drawings, A is the shank of a plural hook having integral therewith the barbed-fish-hooks C. At the end of the shank remote from the hooks is an eye E for attaching the artificial bait to the fishing-line. Loosely mounted upon the shank is a hollow hook guard B, preferably spherical in form and fashioned from an elastic or flexible material such as india-rubber, a rubber fabric, or the like. The guard is easily collapsible under impact or pressure and can be marked or decorated to resemble live or other bait, thereby to lure and attract the fish. When in a normal position upon the shank the guard forms a protection to the hooks and renders fouling practically impossible. The guard being easily removable it is possible to use guards having different markings or decorations. A lure D, formed preferably of a number of feathers, or the like, is attached to the shank by means of a winding F or in any other suitable manner. O and $O^1$ are openings in the guard B adapted to receive the shank A, so that the guard may be easily mounted thereupon. These openings allow the air rapidly to escape from the guard when exterior pressure is exerted on the same. The decorated guard used in conjunction with the feathers, is a sufficient lure for ordinary purposes.

My bait, on account of its spherical, elastic guard protects the points of the hooks from fouling by weeds by deflecting the latter while being drawn through the water. The action of the device is extremely simple. The fish in striking at the bait cause the elastic guard to collapse and be displaced upon the shank and the hooks thereby become exposed.

Having thus described my invention, I claim as new and desire to secure by Letters Patent:

1. In an artificial bait, a shank having a hook, and a guard carried by said shank and movable longitudinally thereof for preventing the fouling of said hook, said guard presenting a rounded surface and constituting a lure.

2. In an artificial bait, a shank having a plural hook, a guard carried by said shank and movable longitudinally thereof for preventing the fouling of said hook and constituting a lure, and a further lure attached to said shank said guard presenting a rounded surface and constituting a lure.

3. In an artificial bait, a shank having a plural hook, a movable spherical guard for preventing the fouling of said hook and constituting a lure, and a further lure attached to said shank and projecting beyond said guard.

4. In an artificial bait, a shank having a plural hook, and a movable guard for preventing fouling of said hook and constituting a lure, said guard being collapsible under impact or pressure and presenting a rounded surface of substantially spherical form.

5. In an artificial bait, a shank having a plural hook, and a guard for said hook adapted to collapse under impact or pressure, said guard having an opening at each end to receive said shank, said openings permitting the separation of said guard and said shank.

6. In an artificial bait, a shank having a hook, and a spherical guard movable upon said shank and normally preventing the fouling of said hook, said guard being adapted to be displaced by a fish to leave the hook exposed.

7. In an artificial bait, a shank having a hook, and a movable spherical guard upon said shank and normally preventing the fouling of said hook.

8. In an artificial bait, a shank having a hook, a hollow guard carried upon said shank and presenting a rounded surface adjacent to the point of said hook, and a lure, said guard being formed from a flexible material.

9. In an artificial bait, a shank, a plural hook integral with said shank, an elastic guard carried by said shank and movable longitudinally thereof, and a lure attached to said shank.

10. In an artificial bait, a shank, said shank having an eye at one end thereof whereby the artificial bait may be attached to the fishing line, a plural hook at the opposite end of said shank, and a spherical elastic guard mounted upon said shank and adapted to prevent said plural hook from fouling.

11. In an artificial bait, a shank having a plural hook, and a movable guard mounted upon said shank, said guard having rounded sides adjacent to the points of said plural hook and being adapted to prevent the fouling of the hook.

12. In an artificial bait, a shank, a spherical elastic guard mounted upon said shank, and a lure attached to said shank within said guard, said guard having an opening permitting the projection of said lure therethrough.

13. In an artificial bait, a shank, a plural hook mounted at one end of the said shank, an elastic guard mounted upon said shank, said guard having rounded sides adjacent to the points of said plural hook, and a feathered lure attached to said shank.

14. In an artificial bait, a shank, said shank having an eye at one end thereof, a plural hook at the opposite end of said shank, and an elastic spherical guard mounted upon said shank, said guard being suitably decorated to attract fish.

In testimony whereof I have signed my name to this specification in the presence of two subscribing witnesses.

ALBERT G. ZAMEL.

Witnesses:
   FRANK E. SCHUBERT,
   MICHAEL HOFERT.